June 26, 1928.
S. B. HASELTINE
1,674,825
FRICTION SHOCK ABSORBING MECHANISM
Filed Aug. 21, 1925 2 Sheets-Sheet 2
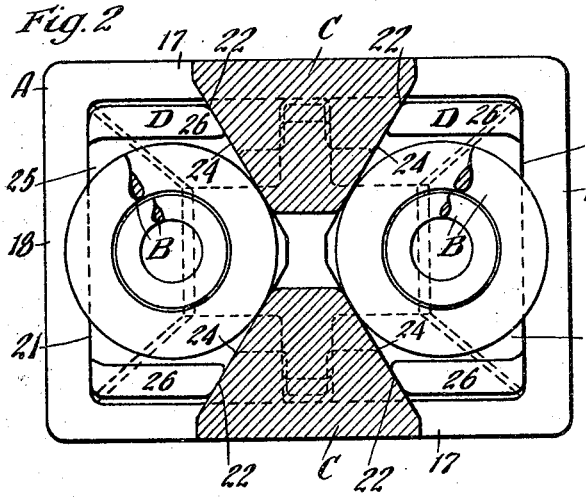
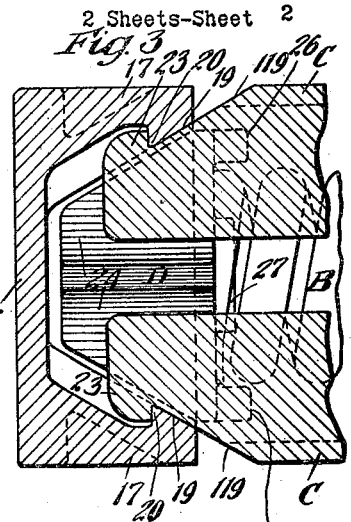
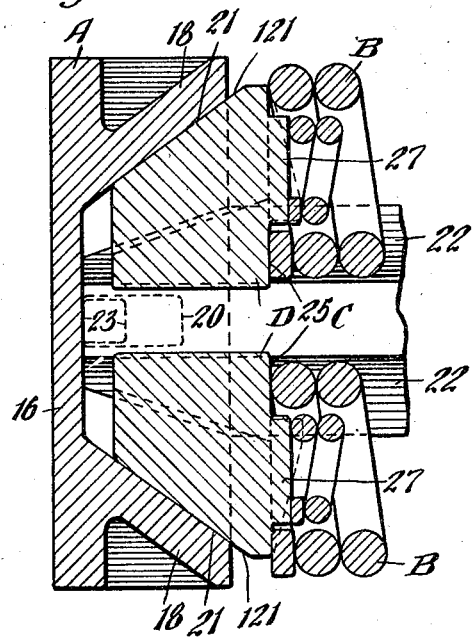
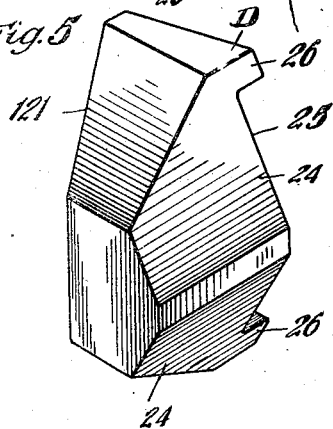
Witness
Wm. Geiger
Inventor
Stacy B. Haseltine
By George J. Haight
His Atty.

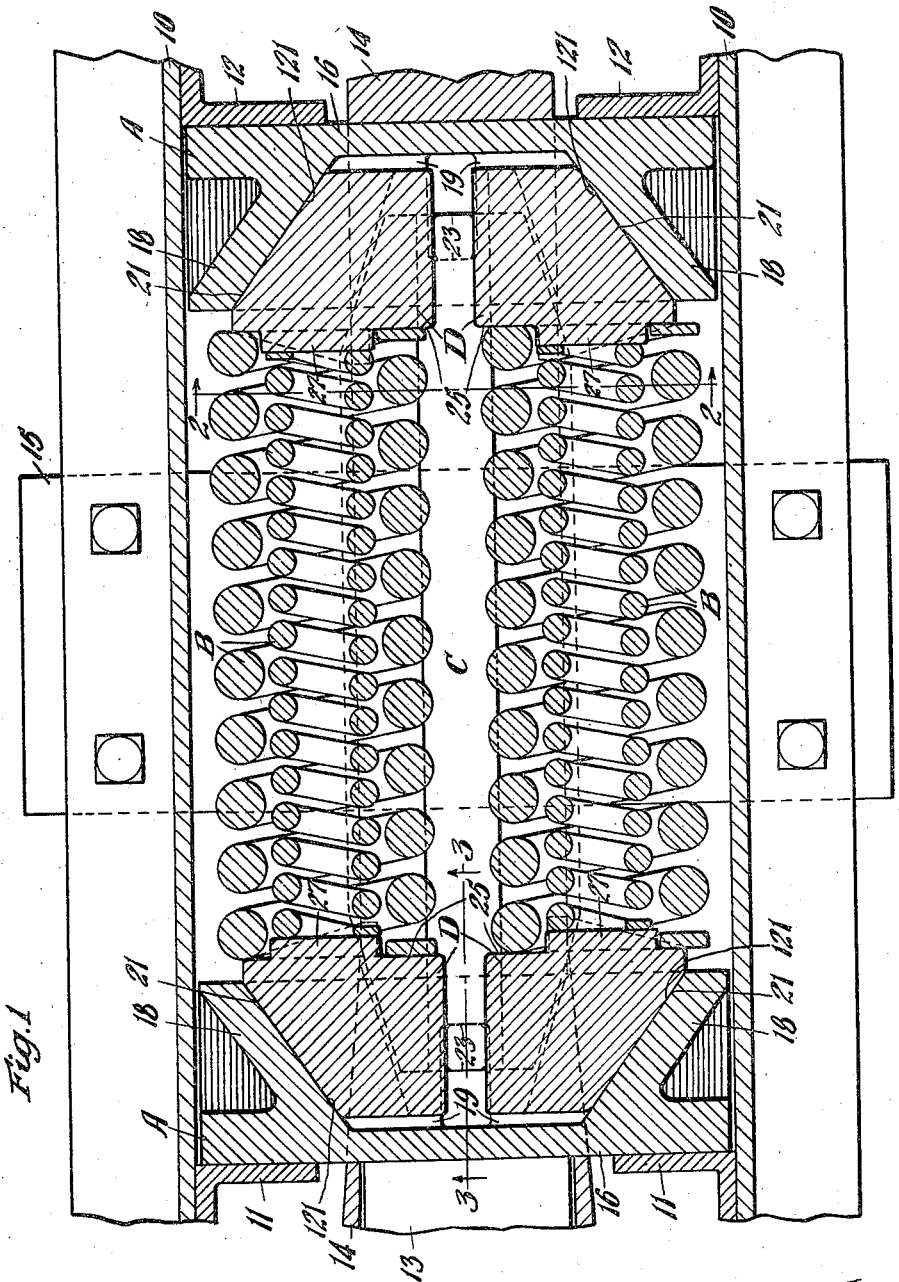

Patented June 26, 1928.

1,674,825

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed August 21, 1925. Serial No. 51,601.

This invention relates to improvements in friction shock absorbing mechanisms.

One object of the invention is to provide a friction shock absorbing mechanism, especially designed for railway draft riggings, wherein is provided high capacity, together with certain release.

Another object of the invention is to provide a shock absorbing mechanism of the character indicated, including a plurality of friction elements having co-acting sets of combined friction and wedge faces, wherein each set of combined faces frictionally co-operate during relative movement in one direction and simultaneously function as wedge faces due to relative movement of the elements in a different direction, together with means for effecting lateral and longitudinal movement of all of said elements.

A further object of the invention is to provide a shock absorbing mechanism including follower acting means; spring resistance means; a pair of friction elements having wedging engagement with the follower acting means; a plurality of friction shoes having frictional engagement with the friction elements and wedging engagement with the follower acting means, wherein the shoes and friction elements also have wedging engagement with each other, whereby a modified or differential action is had and additional compression of the spring resistance means is effected.

Still another object of the invention is to provide a mechanism of the character indicated, comprising a plurality of co-acting friction elements, follower acting members, and spring resistance means, wherein the friction elements have co-acting sets of faces, each of which functions both as a friction and as a wedge face, and certain of said elements co-operate with the follower members when the mechanism is fully compressed to provide a solid column to transmit the force directly to the draft sills and to prevent the spring resistance means from being subjected to an excessive load.

Other objects and advantages of the invention will more fully and clearly appear from the description and claims hereinafter following.

In the drawings, forming a part of the specification, Figure 1 is a horizontal, longitudinal, sectional view of a railway draft rigging, showing my improvements in connection therewith. Figure 2 is a vertical, transverse, sectional view corresponding substantially to the line 2—2 of Figure 1. Figure 3 is a vertical, longitudinal, sectional view of the front end of the mechanism, corresponding substantially to the line 3—3 of Figure 1. Figure 4 is a view similar to Figure 1, showing the front end of the mechanism and illustrating the position of the parts when the mechanism is fully compressed. And Figure 5 is a detailed, perspective view of one of the friction shoes used in connection with my improved mechanism.

In said drawing, 10—10 indicate channel-shaped center or draft sills of a railway car underframe, to the inner faces of which are secured front stop lugs 11—11 and rear stop lugs 12—12. The inner end of the drawbar is indicated by 13 to which is operatively connected a hooded yoke 14 of well known form. The shock absorbing mechanism proper is disposed within the yoke and the yoke and parts therewithin are supported in operative position by a detachable saddle plate 15 suitably secured to the draft sills.

The improved shock absorbing mechanism proper, as shown, comprises, broadly, front and rear followers A—A; twin arranged main spring resistance elements B—B; a pair of longitudinally disposed friction elements C—C; and front and rear pairs of friction wedge shoes D—D.

The front and rear followers A are of like construction and are adapted to co-act with the front and rear stop lugs respectively. Each of the followers has a main plate-like section 16, spaced top and bottom walls 17—17, and spaced side walls 18—18. The top and bottom walls diverge inwardly of the mechanism as shown, thereby presenting interior, inwardly diverging opposed wedge faces 19—19. Each wall 17 is interiorly slotted as shown, thereby providing a stop shoulder 20 at the inner end thereof, for a purpose hereinafter described. The side walls 18 of each follower A also diverge inwardly of the mechanism and present a pair of opposed, interior, inwardly diverging wedge faces 21—21.

The friction elements C—C are of similar design, each being in the form of an elongated, heavy bar having outer wedge faces 119 at the opposite ends thereof, each wedge face 119 co-operating with a wedge face 19 of one of the followers A and being correspondingly inclined thereto. At the opposite sides, each element C is provided with a pair of laterally converging longitudinally disposed faces 22—22. Each of the elements C has a pair of lugs 23 at the opposite ends thereof, the lugs being adapted to cooperate with the corresponding shoulders 20 of the front and rear followers A to limit the outward movement of the followers and also restore the friction elements to central position after each compression stroke of the mechanism.

As clearly shown in Figures 2 and 3, the friction elements C are normally spaced apart so as to allow full lateral approach of the same during compression of the mechanism.

The friction shoes D are arranged in pairs at opposite ends of the mechanism. All of the shoes D are of like construction and as most clearly shown in Figure 5, each shoe is in the form of a block having an outer wedge face 121 correspondingly inclined to one of the wedge faces 21 of the corresponding follower and co-operating therewith. On the inner side, each block D is provided with a pair of faces 24, the faces 24 being disposed longitudinally of the mechanism and at an angle to each other and co-operating respectively with the surfaces 22 of the respective friction elements C at the same side of the mechanism. Each shoe is provided with a flat face 25 at the inner end thereof adapted to form an abutment for the corresponding free end of the spring resistance elements B. Each shoe also has a pair of overhanging ledges 26 and a central boss 27 at the inner end thereof, the boss 27 being adapted to extend into the outer coil of the corresponding spring resistance and forming an abutment for the end of the inner coil. The ledges 26 increase the length of the shoes thereby preventing the same from tilting during compression. As shown, the ledges 26 over-hang the outer coil of the corresponding spring, thus also serving to center the same.

The spring resistance elements C consist of twin arranged units, each unit comprising a relatively light inner coil and a heavier outer coil, the inner coil having its opposite ends bearing on the bosses 27 of the corresponding front and rear friction shoes and the opposite ends of the outer coil bearing directly on the inner ends of said shoes. As most clearly shown in Figure 5, each shoe is cut away on opposite sides at the outer end thereof to provide clearance for the inwardly diverging top and bottom walls of the corresponding follower.

The mechanism is held under initial compression and of overall uniform length by the elements C, the lugs 23 of which engage the shoulders 20 of the front and rear followers.

The operation of the mechanism during a compression stroke is as follows: As the front and rear followers are moved relatively toward each other, the friction wedge shoes D will be forced laterally inward and carried longitudinally of the mechanism on the friction surfaces 22 of the friction elements C, compressing the main spring resistance elements B therebetween. Simultaneously with this movement of the friction shoes, the friction elements C will be wedged laterally inward toward each other by the approach of the front and rear followers. Due to the angular relation of the surfaces 22 of each of the elements C the friction shoes D will be wedged apart, thereby effecting a differential action, the shoes D sliding laterally outwardly on the faces 21 of the followers A. This differential action will effect an additional compression of the main springs. The described action will continue until the actuating force is reduced or inward movement of the front and rear followers is limited by engagement with the opposite ends of the friction elements C, the elements C then acting as a solid column, transmitting the actuating force directly to the draft sills and relieving the main springs B from excessive pressure. During release, when the actuating pressure is reduced, the springs B will effect restoration of all the parts to normal position, relative separation of the front and rear followers longitudinally of the mechanism being limited by the lugs 23 on the friction elements C, as hereinbefore pointed out.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with relatively movable front and rear main followers having wedge faces; of a plurality of relatively movable friction elements said elements having co-acting combined friction and wedge faces certain of said elements having wedge faces at the opposite ends thereof cooperating with certain of said front and rear follower wedge faces, and the remaining elements each having a wedge face cooperating with one of the remaining follower wedge faces; and means for yieldingly opposing relative movement of said last named elements.

2. In a friction shock absorbing mechanism, the combination with relatively movable follower acting elements; of a plurality of relatively movable friction elements, some of said elements having wedging engagement with at least one of said follower acting elements, and all the remaining friction elements having wedging engagement with both follower elements, said last named friction elements having both frictional and wedging engagement with the other friction elements; and spring means resisting relative movement of said friction elements.

3. In a friction shock absorbing mechanism, the combination with a plurality of friction elements, said elements being relatively movable longitudinally of the mechanism, and said elements having co-operating wedge faces for effecting a spreading action of the same, said elements being longitudinally slidable with reference to each other on said last named wedge faces; of front and rear follower acting means, some of said elements having wedging engagement with both the front and rear follower acting means for effecting lateral approach of said elements, and all the remaining elements each having wedge engagement with one of said follower acting means; and means for yieldingly resisting relative movement of said last named elements.

4. In a friction shock absorbing mechanism, the combination with front and rear followers, having wedge faces thereon; of longitudinally disposed friction elements interposed between said followers, said elements each having wedge faces at the opposite ends thereof co-operating with certain of the wedge faces of the respective followers; friction wedge shoes co-operating with the followers, said shoes and friction elements having co-operating longitudinally disposed friction surfaces and the shoes being longitudinally slidable on said elements, the co-operating friction surfaces of said shoes and elements being disposed to effect a wedging action between said elements and shoes when the mechanism is being compressed; and means for yieldingly opposing movement of said shoes.

5. In a friction shock absorbing mechanism, the combination with front and rear, relatively movable followers; of a plurality of longitudinally disposed friction elements, said elements and followers having co-operating wedge faces acting to force said elements laterally inward toward each other during relative approach of said followers; friction shoes having wedging engagement with said followers, said shoes and elements having co-operating wedge faces for forcing said shoes apart during relative lateral approach of said elements, said shoes being longitudinally movable with reference to said elements on said co-operating wedge faces; and spring resistance means co-operating with said shoes.

6. In a friction shock absorbing mechanism, the combination with front and rear, relatively movable followers; of a pair of longitudinally disposed, friction elements, said elements and followers having co-operating wedge faces acting to force said elements laterally inward toward each other during relative approach of the followers; a pair of friction shoes having wedging engagement with each follower, said shoes and elements having co-operating wedge faces for forcing said shoes apart during relative lateral approach of said elements, said shoes being longitudinally movable with reference to said elements on the co-operating wedge faces thereof; and yielding means opposing relative movement of the shoes.

7. In a friction shock aborbing mechanism, the combination with front and rear followers, each having interior, inwardly diverging sets of wedge faces; of a pair of longitudinally disposed friction elements, each having a pair of longitudinally disposed friction surfaces, said surfaces being angularly disposed with reference to each other, each of said elements having wedge faces at the opposite ends thereof, each face co-operating with a face of one set of wedge faces of the corresponding follower; front and rear pairs of friction shoes having wedge faces co-operating with the remaining sets of wedge faces of said followers, each of said shoes having a pair of longitudinally disposed friction surfaces angularly disposed with reference to each other, each of said surfaces engaging one of the friction surfaces of said elements; and a spring resistance co-operating with said friction shoes.

8. In a friction shock aborbing mechanism, the combination with front and rear followers, each having two sets of opposed, inwardly diverging wedge faces; a pair of longitudinally disposed friction elements, each having a wedge face at each end thereof, each of said faces co-operating with one of the wedge faces of one of said sets of the corresponding follower; wedge friction shoes having wedge faces co-operating with the remaining sets of wedge faces of said followers, said shoes being interposed between said elements and having wedging engagement therewith, on faces disposed longitudinally of the mechanism, said shoes being slidable longitudinally on said last named faces; and spring resistance means co-operating with said shoes.

9. In a friction shock absorbing mechanism, the combination with front and rear followers; of a plurality of longitudinally disposed friction elements; friction members co-operating with said elements; co-operating means on said followers and elements for forcing said elements toward each other; co-operating means on said followers and members for pressing the latter against said elements; co-acting means on said members and elements for effecting spreading of said members upon relative approach of said elements; and spring means resisting movement of said members.

10. In a friction shock absorbing mechanism, the combination with front and rear relatively movable followers; of a set of longitudinally disposed friction elements, said elements being adapted to be engaged by both of said followers upon compression of the mechanism to transmit the actuating force directly from one follower to the other, said elements having wedging engagement with the followers; a plurality of friction shoes longitudinally slidable on said friction elements and having wedging engagement therewith, said shoes also having wedging engagement with the followers; and a spring resistance co-operating with the shoes.

11. In a friction shock absorbing mechanism, the combination with front and rear followers having wedge faces thereon; of longitudinally disposed friction elements interposed between said followers, said elements each having wedge faces at the opposite ends thereof co-operating with certain of the wedge faces of the respective followers; co-operating means on said followers and elements for restoring the latter to normal position after each compression of the mechanism; friction wedge shoes co-operating with the followers, said shoes and friction elements having co-operating longitudinally disposed friction surfaces, and the shoes being longitudinally slidable on said elements, the co-operating friction surfaces of said shoes and elements being disposed to effect a wedging action between said elements and shoes when the mechanism is compressed; and means for yieldingly opposing movement of said shoes.

12. In a friction shock absorbing mechanism, the combination with relatively movable follower acting elements; of a plurality of relatively movable friction elements, certain of said elements having wedging engagement with at least one of said follower acting elements and the remaining friction elements having wedging engagement with both follower elements, said followers and last named elements having interengaging means thereon for restoring the latter to normal position, said last named elements also having both frictional and wedging engagement with the other friction elements; and spring means resisting relative movement of said friction elements.

In witness that I claim the foregoing I have hereunto subscribed my name this 19th day of August 1925.

STACY B. HASELTINE.